Nov. 23, 1937.   H. E. STEIN   2,100,225
OPERATING MECHANISM FOR AUTOMOTIVE VEHICLES
Filed Dec. 18, 1936   2 Sheets-Sheet 1

Inventor
HENRY E. STEIN
By Paul P. Paul & Moore
ATTORNEYS

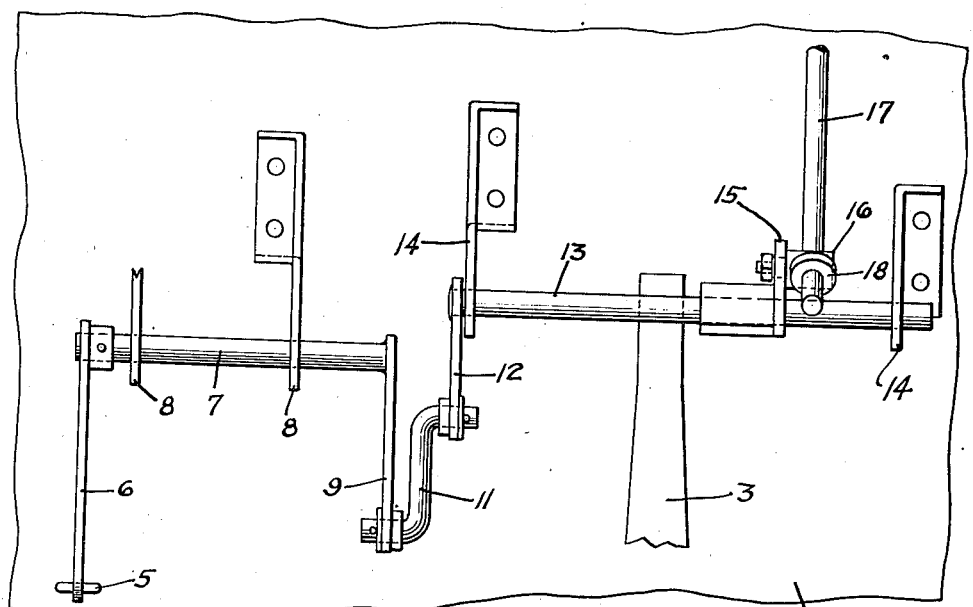
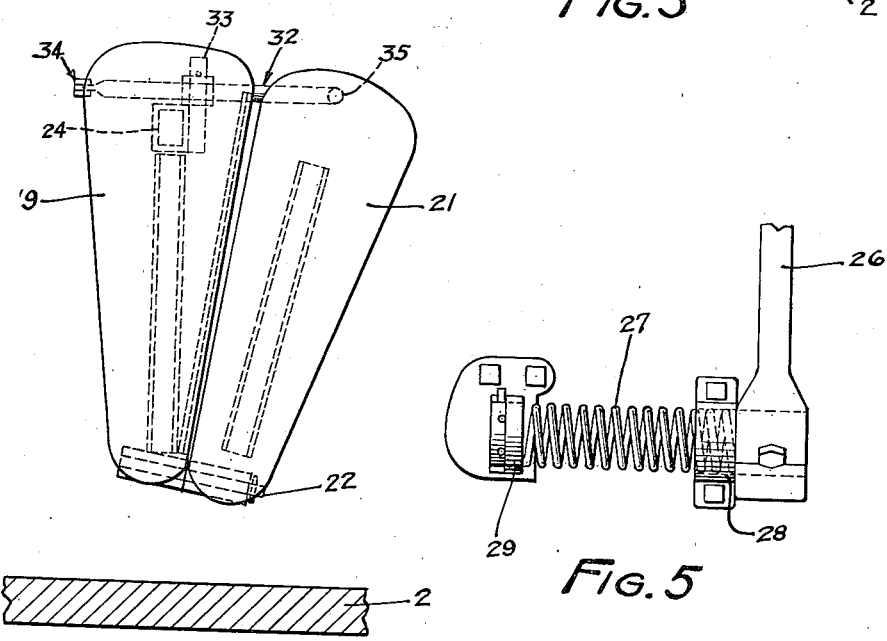

Patented Nov. 23, 1937

2,100,225

UNITED STATES PATENT OFFICE 2,100,225

OPERATING MECHANISM FOR AUTOMOTIVE VEHICLES

Henry E. Stein, Mankato, Minn.

Application December 18, 1936, Serial No. 116,559

9 Claims. (Cl. 192—3)

This invention relates to new and useful improvements in operating mechanisms for automotive vehicles, and more particularly to means for controlling the operations of the brakes and the fuel feeding means.

The usual brake and throttle pedals of most conventional automobiles, are now commonly spaced some distance apart and are usually disposed at different elevations, whereby the driver must bodily move his foot from one pedal to the other, in the operation of controlling the traveling movement of the vehicle. The time required to move the foot from the throttle to the brake pedal is commonly known as the "reaction time", and upon the reaction time, depends to a great extent, the minimum distance traveled by the vehicle, after the driver receives the first impulse to quickly stop his car, as when suddenly confronted with an emergency, when driving at a relatively high speed. The reaction time of different individuals may vary considerably. The loss of a single second in the reaction time, when traveling at a high rate of speed, will result in the car traveling a relatively greater distance before being brought to a stop, and may result in a serious accident. It is therefore highly desirable, as a safety measure, to provide means whereby the reaction time may be reduced to a minimum, whereby the driver may, under all normal conditions, bring his car to a complete stop, when confronted with an emergency, before an accident results.

To reduce the reaction time to a minimum, I have arranged the brake and throttle pedals in close proximity, and in a common plane, as disclosed in my patent, No. 2,020,440, whereby the driver may readily shift his foot from the throttle to the brake pedal without having to bodily lift his foot, as is now usually necessary, when operating automobiles equipped with conventional control mechanisms. In addition to thus arranging the brake and throttle pedals in a common plane, to reduce to a minimum, the reaction time, means is also provided in this new mechanism, whereby should the driver inadvertently depress only the throttle pedal or accelerator, when an obstruction suddenly looms up before him, the throttle is automatically released and the brake set, when the throttle pedal is depressed to a predetermined point in its travel, whereby the vehicle may be brought to a complete stop by the simple depression of the throttle pedal only.

An important feature of the present invention, therefore, resides in the unique arrangement of the brake and throttle pedals, and the manner in which they are interconnected, whereby the throttle and brake pedals may be operated independently of one another, and whereby both the throttle and brake may be operated by the manipulation of the throttle pedal only.

A further object is to provide a throttle operating mechanism adapted to be mounted directly upon and carried by the brake actuating member or pedal, and which mechanism is so constructed that it may readily be applied to the brake pedals of many conventional automotive vehicles.

A further object of the invention is to provide an operating mechanism whereby the throttle pedal is so associated with the brake pedal that when the latter is depressed to set the brakes, the throttle pedal cannot be actuated to open the throttle.

A further object is to provide means for limiting the opening of the throttle, whereby the throttle operating mechanism may be selectively adjusted to a predetermined maximum speed, so that the vehicle cannot be driven beyond said permitted maximum speed.

Other objects of the invention reside in the unique mounting of the throttle pedal or accelerator directly upon the brake pedal, and which throttle pedal is so connected to the throttle linkage that when the brake pedal is depressed to set the brakes, the throttle pedal is rendered inoperative to open the throttle; in the arrangement of the pivoted member on the brake pedal which has a portion positioned to be engaged by the throttle pedal, whereby said member may be relatively oscillated upon the brake pedal by independent movement of the throttle pedal, thereby to open or close the throttle; in the means provided in connection with said pivoted member whereby the movement may be varied to limit the amount of fuel fed to the vehicle engine; in the provision of means located convenient to the driver's seat for relatively adjusting the limit stop on the pivoted member, thereby to limit the maximum speed of the vehicle to conform to that permitted by law in different zones or areas; in the simple and inexpensive construction of the operating mechanism, as a whole, whereby it may be manufactured in quantity production at small cost; and in the provision of such a mechanism which may readily be substituted for the operating mechanisms now employed on a great many conventional automobiles.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 3 is a fragmentary view substantially on the line 3—3 of Figure 1;

Figure 4 is a detail view showing the preferred arrangement of the brake and throttle pedals; and Figure 5 is a detail view on a relatively larger scale, showing a means for yieldably supporting the brake and throttle pedals in their normal inoperative positions.

Figure 1:
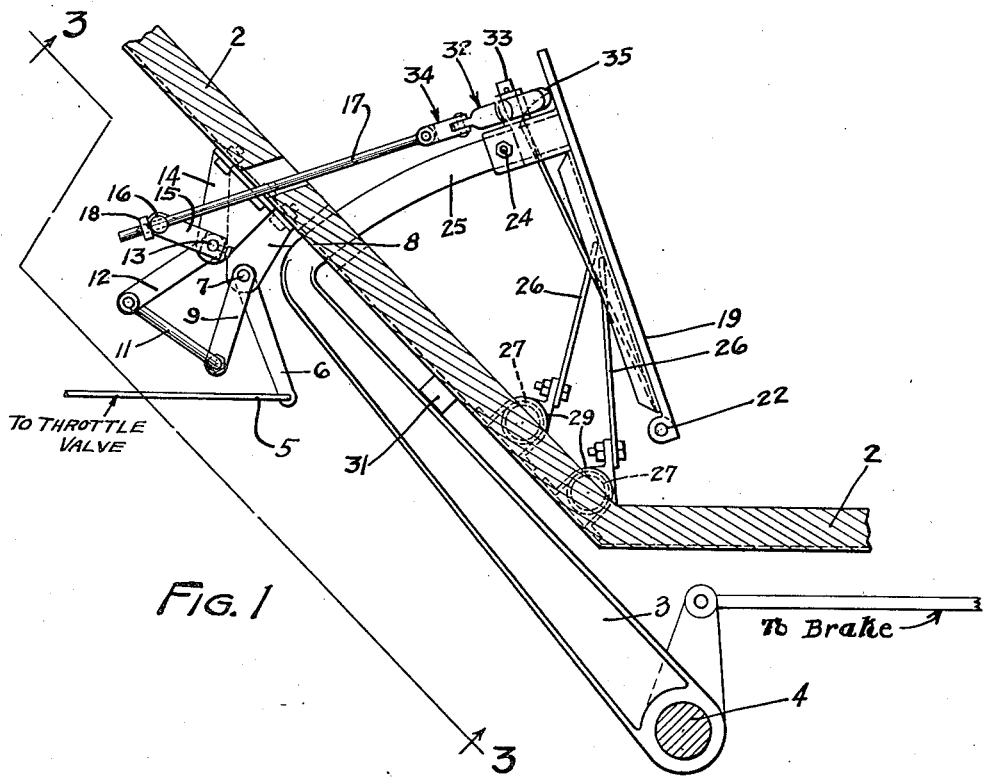
Figure 1 is a detail sectional view showing the connection between the throttle pedal and the linkage of the throttle.

In the selected embodiment of the invention here shown, there is diagrammatically illustrated in Figure 1, for purposes of disclosure, the floor boards 2 of an automotive vehicle, beneath which the usual brake arm 3 is shown mounted upon a shaft 4 in the usual manner. A suitable connection 5, having one end connected to the usual throttle valve of the carburetor, (not shown) has one end connected to an arm 6 shown fastened to one end of a shaft 7 mounted in suitable brackets 8, suitably secured to the vehicle frame, as best illustrated in Figure 1.

An arm 9 is secured to the opposite end of the shaft 7 and has a link 11 connecting it to an arm 12, fixed to one end of a shaft 13 which, like the shaft 7, may be mounted in suitable brackets 14 secured to the frame of the vehicle in a manner similar to the brackets 8. An arm 15 is suitably secured to the shaft 13 between the brackets 14, and has rotatably mounted at its outer end, a suitable guide 16 adapted to slidably receive one end of an operating rod 17. The rod 17 has a suitable collar 18 secured thereto for limiting sliding movement of the rod in the guide 16, in one direction.

An important feature of the present invention resides in the novel construction and arrangement of the brake and throttle actuating members, whereby the driver may always keep his foot in direct contact with said control pedals, and whereby depression of either of said pedals, or both, will result in the release of the throttle and the application of the brakes. It is well known that serious accidents have heretofore resulted because of drivers inadvertently depressing the throttle pedal or accelerator instead of the brake pedal, in an attempt to quickly stop the vehicle in the face of an impending accident, thus causing the car to speed or leap forwardly, rather than coming to a complete stop. This objectionable feature has been completely eliminated in the present mechanism.

The novel control mechanism herein disclosed comprises a foot engaging member or plate 19, which will hereinafter be referred to as the brake pedal. This pedal is detachably secured to the upper portion 25 of the brake arm 3 by such means as a suitable bolt 24. A socket may be provided in the pedal 19 for receiving the terminal of the portion 25 of the brake arm 3, as clearly illustrated in Figure 1.

Figure 2:
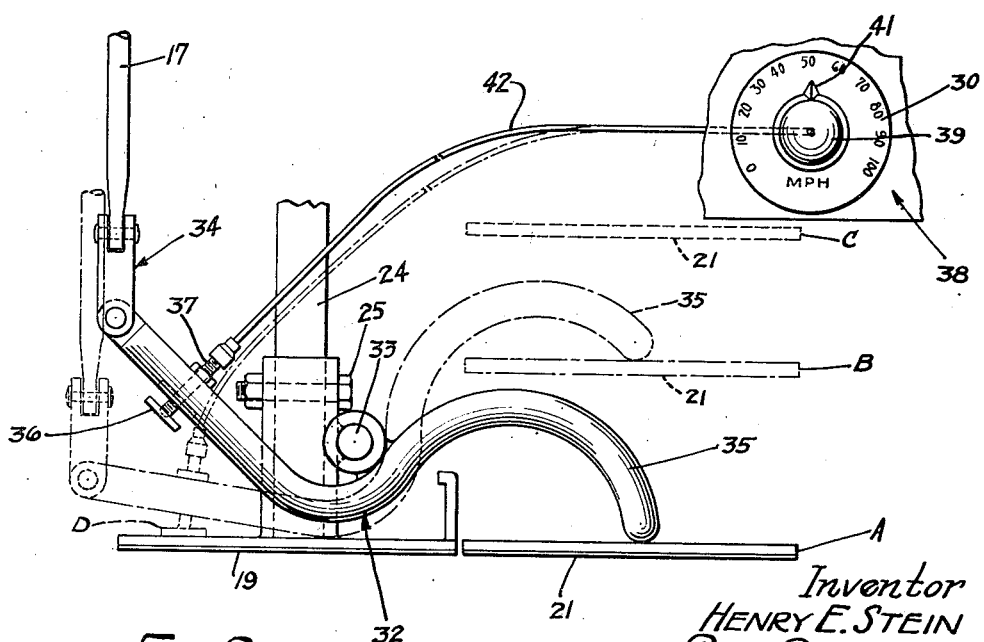
Figure 2 is a top view of Figure 1, with some of the parts omitted, and showing the means provided on the brake pedal for transmitting motion from the throttle pedal to the throttle linkage.

A throttle operating pedal 21 is mounted adjacent to the brake pedal 19 and is pivotally supported on a pin or pivot 22 suitably secured in the lower portion of the brake pedal 19. The foot pedals 19 and 21 are normally disposed in a common plane, as best illustrated in Figure 2, whereby the operator may readily shift his foot from one pedal to the other in the operation of controlling the traveling movement of the vehicle. The brake and throttle pedals 19 and 21 are shown yieldably retained in their normal inoperative positions by spring-actuated arms 26. These arms are suitably secured to the adjacent ends of a pair of tortion springs 27, rotatably supported in suitable guides 28. The opposite ends of the springs 27 are shown adjustably secured to brackets 29, whereby the tension of the springs 27 may be varied to provide the desired pedal pressure. The brackets 29 are secured to fixed portions of the vehicle body or chassis. It is to be understood that other spring means applicable for the purpose, may be used in lieu of the springs 27 to support the brake and throttle pedals 3 in their normal inoperative positions. A suitable stop may be provided for limiting the upward movement of the brake arm 3, as shown, for example, at 31 in Figure 1.

The linkage for operating the connection 5 of the throttle valve is operated by the throttle pedal 21 through an arm, generally indicated by the numeral 32. This arm is pivotally supported upon the brake pedal 19 by means of a suitable pivot 33, secured to the pedal. A universal connection, generally indicated by the numeral 34, operatively connects one end of the rod 17 to one end of the arm 32, as best shown in Figures 1 and 2. The end portion 35 of the arm 32 is preferably shaped, as shown in Figure 2, to permit free movement of the throttle pedal 21, independently of the brake pedal 19, and whereby relative movement of the throttle pedal will relatively oscillate the arm 32 on the brake pedal, thereby to operate the linkage mechanism connecting the rod 17 to the connection 5 of the throttle valve. In other words, by referring to Figure 1, it will be noted that when the rod 17 is moved upwardly, or in a direction towards the right, when viewed as shown in this figure, the arm 6 is thrust forwardly or to the left, thereby actuating the connection 5 and opening the throttle valve of the carburetor.

By operatively associating the throttle pedal 21 with the brake pedal 19, as above described, it will be seen that the two pedals are adapted for independent movement in the operation of controlling the speed of the vehicle. Because of the lower end of the rod 17 being slidably supported in the guide 16 in the arm 15, the brake pedal 19 may be depressed to operate the brakes without imparting any movement to the carburetor linkage, shown in Figure 1. This results because of the sliding connection between the rod 17 and arm 15, whereby the lower end of the rod 17 simply idles back and forth in the guide 16 without imparting movement to the carburetor linkage.

When the throttle pedal 21 is depressed independently of the brake pedal 19, the throttle valve of the engine is operated as previously stated, provided, of course, that the brake pedal is substantially in its normal inoperative position. In other words, to operate the throttle valve to increase the fuel supply to the engine, the brake pedal must be substantially in its normal inoperative position, as shown in Figures 1 and 2. This is an important feature of the invention, as it positively prevents the driver from increasing the fuel supply to the engine, when attempting to set the brakes, at which time the fuel supply to the engine obviously should be cut off, at least, to an idling speed.

Another important feature of the present invention resides in the unique arrangement of the throttle and brake pedals, whereby, if desired, the operation of the brakes may be accomplished by manipulation of the throttle pedal only. As previously stated, the throttle pedal 21 is supported entirely upon the brake arm 3, by reason of its connection with the brake pedal 19, whereby it is movable therewith as a unit. The throttle, however, is not opened, unless the throttle pedal 21 is moved relatively to the brake pedal 19. As best shown in Figure 2, when the throttle pedal is operated between the full and dotted line positions A, and B, respectively, the fuel supply to the engine is controlled in the usual manner, and such range of movement of the throttle will permit full range of engine speed depending, of course, upon the adjustment of the mechanism. Should the driver, however, depress the throttle pedal 21 beyond position B or, to position C, the brake pedal 19 will automatically move downwardly, whereby the brakes are set, and at the same time, the throttle is released to cut off the feed supply to the engine. This is brought about because of the limited movement of the arm 32 which, as shown in Figure 2, carries an adjustable stop 36 adapted to engage the brake pedal 19, as shown at D in Figure 2. When the stop 36 engages the brake pedal, the arm 32 and brake pedal move downwardly as a unit with the throttle pedal, causing the lower end of the rod 17 to permit the arm 15 to return to throttle-closing position, whereby the vehicle may be quickly brought to a complete stop.

The stop 36, carried by the arm 32, serves an important function in that it provides means whereby the amount of fuel fed to the engine may be restricted, thereby to limit the traveling speed of the vehicle to a predetermined figure. To accomplish the above, the stop 36 is shown secured to one end of a threaded element 37 adjustably supported in the arm 32, whereby the spacing between the stop 36 and the adjacent face of the pedal 19 may be varied, thereby to limit the relative oscillation of the arm 32 on the brake pedal 19. In Figure 2, there is diagrammatically illustrated a device, generally indicated by numeral 38, for conveniently relatively adjusting the stop 36 in the arm 32, in accordance with maximum speeds permitted in various zones or areas through which the driver may pass.

This device may comprise a suitable knob 39 having a pointer 41 adapted to register with suitable indicia or markings, as, for example, miles per hour, provided on a suitable dial 30. The pointer 41 is shown operatively connected to the adjusting screw 37 by a suitable connection 42, which may be flexible or otherwise constructed to suit conditions. The device 38 may be located on the instrument panel of the vehicle, whereby it may be conveniently manipulated by the driver, so as to render the car capable of traveling only at permitted top or maximum speeds, in accordance with maximum speeds permitted by law through various designated zones or areas along the highway or in districts through which he may be traveling.

The novel operating mechanism herein disclosed, has been found, from actual experience, to greatly facilitate the operation of controlling a vehicle. Because of the unique arrangement of the throttle pedal 21 with respect to the brake pedal 19, the danger of the driver accidentally depressing the throttle pedal and causing the car to catapult or leap forwardly, is positively eliminated, thereby reducing the possibility of accidents occurring from such inadvertent operation of the throttle pedal or accelerator, when the driver is confronted with an emergency.

Another feature of the present invention resides in the fact that when the brake pedal is depressed to operate the brakes, the throttle pedal cannot be operated to increase the fuel supply to the vehicle engine, even though the driver should depress the throttle pedal simultaneously with the brake pedal, which is possible because of the two pedals being disposed in close relation and in a common plane. The throttle pedal, as previously stated, is rendered ineffective to actuate the throttle, when the brake pedal is depressed, because of the rod 17 sliding forwardly in the guide 16 in the arm 15, whereby movement of the rod 17 in the opposite direction will have no effect upon the arm 15 because of the collar 18 being out of engagement with the guide 16.

By the employment of the novel operating mechanism herein disclosed, the reaction time of the driver in shifting his foot from the throttle to the brake pedal, is reduced to a minimum which, obviously, will reduce the distance in which the car may be stopped, when the driver is confronted with an emergency. In fact, the driver need not shift his foot from the throttle pedal to the brake pedal in an attempt to quickly stop the car, as the fuel supply to the engine is automatically cut off and the brakes set, when either or both of the foot pedals 19 and 21 are depressed. Thus, it will be seen that the novel operating mechanism herein disclosed greatly facilitates the operation of controlling the traveling movement of the vehicle and, in addition, provides the utmost in safety, in that the vehicle may be quickly stopped, by the simple depression of either the brake pedal or the throttle pedal, or both, whereby the reaction time is reduced to a minimum. The unique arrangement of the control pedals 19 and 21, therefore, is of vital importance in that it provides, in effect, a single member control, which does not require the driver to bodily lift his foot from one pedal to another, when called upon to quickly stop his car which, unquestionably, will result in the avoidance of a great many accidents, which might otherwise be unavoidable, primarily, because of the increased reaction time required to shift from the throttle to the brake pedal in conventional vehicle operating mechanisms.

The novel control pedal mechanism herein disclosed is also so constructed that it may readily be substituted for the usual control mechanism now employed in numerous well-known automotive vehicles or automobiles.

I claim as my invention:
1. The combination with an automotive vehicle comprising a throttle and a brake, of an operating mechanism for said throttle and brake comprising a brake pedal and a throttle pedal disposed in a common plane, whereby the driver may shift his foot from one pedal to the other with a minimum of movement, means carried by the brake pedal for transmitting motion from the throttle pedal to the throttle, but which means has no effect upon the throttle when the brake pedal is actuated, means whereby the throttle pedal can be operated to open the throttle only when the brake pedal is substantially in its normal inoperative position, and means convenient to the driver's seat for limiting the opening of the throttle whereby the vehicle cannot be driven beyond a predetermined speed.

2. The combination with an automotive vehicle comprising a throttle and a brake, of an operating mechanism for said throttle and brake comprising a brake pedal and a throttle pedal disposed in a common plane, a pivoted member carried by the brake pedal and having an operative connection with the throttle, said pivoted member having a portion positioned in the path of the throttle pedal, whereby it may be relatively actuated upon the brake pedal to increase the amount of fuel fed to the vehicle engine, and means whereby the throttle is rendered ineffective to increase the fuel supply to the engine, when the brake pedal is depressed.

3. The combination with an automotive vehicle comprising a throttle and a brake, of an operating mechanism for said throttle and brake comprising a brake pedal and a throttle pedal disposed in a common plane, a pivoted member carried by the brake pedal and having an operative connection with the throttle, said pivoted member being ineffective to operate the throttle when the brake pedal is depressed, and said pivoted member having a portion positioned in the path of the throttle pedal, whereby it may be relatively actuated upon the brake pedal by manipulation of the throttle pedal, thereby to control the supply of fuel fed to the vehicle engine, and means whereby when the throttle pedal is depressed beyond a predetermined length of its travel, the throttle is released and the brake is set.

4. The combination with an automotive vehicle comprising a throttle and a brake, of an operating mechanism for said throttle and brake comprising a brake pedal and a throttle pedal disposed in a common plane, whereby the driver may readily shift his foot from one pedal to the other with a minimum of movement, a pivoted member carried by the brake pedal and having an operative connection with the throttle, said pivoted member being ineffective to actuate the throttle to increase the fuel supply to the engine, when the brake pedal is depressed, said pivoted member having a portion adapted to be engaged by the throttle pedal, whereby it may be relatively oscillated on the brake pedal by independent movement of the throttle pedal, the connections between the throttle and throttle pedal being such that the throttle cannot be opened, when the brake pedal is depressed, regardless of the movement of the brake pedal, and means for limiting the opening of the throttle, whereby the vehicle cannot be driven beyond a predetermined speed, regardless of the manipulation of the throttle pedal.

5. The combination with an automotive vehicle comprising a throttle pedal and a brake pedal, of a throttle operating member carried by the brake pedal and relatively movable thereon to operate the engine throttle, and an adjustable stop operatively associated with the throttle operating member and the brake pedal for limiting relative movement of said member, thereby to restrict opening of the throttle to a size commensurate to a predetermined engine speed.

6. The combination with an automotive vehicle comprising throttle pedal and brake disposed transversely of the vehicle, of a throttle operating member carried by the brake pedal and relatively movable thereon to operate the engine throttle, and means operatively connecting the throttle operating member with the brake pedal whereby when said member is depressed beyond a predetermined point in its travel, the brake pedal is actuated to set the brakes and the throttle is released.

7. The combination with an automotive vehicle comprising a throttle and a brake, of an operating mechanism for said throttle and brake comprising a brake pedal and a throttle pedal, a member movably mounted on the brake pedal and having an operative connection with the throttle valve, said movable member having a portion positioned in the path of the throttle pedal, whereby it may be relatively actuated upon the brake pedal to control the supply of fuel fed to the vehicle engine, and means whereby the throttle pedal is rendered ineffective to increase the fuel supply to the engine, when the brake pedal is depressed.

8. The combination with an automotive vehicle comprising a throttle and a brake, of an operating mechanism for said throttle and brake comprising a brake pedal and a throttle pedal disposed substantially in a common plane, a member movably mounted on the brake pedal and having an operative connection with the throttle valve, said movable member being ineffective to operate the throttle valve when the brake pedal is depressed, and said movable member having a portion positioned in the path of the throttle pedal, whereby it may be relatively actuated by the brake pedal by manipulation of the throttle pedal, thereby to control the supply of fuel fed to the vehicle engine, and means whereby when the throttle pedal is depressed beyond a predetermined length of its travel, the throttle valve is released and the brake is set.

9. The combination with an automotive vehicle comprising a throttle and a brake, of an operating mechanism for said throttle and brake comprising a brake pedal and a throttle pedal so arranged with respect to one another that the driver may readily shift his foot from one pedal to the other with a minimum of movement, a member movably mounted on the brake pedal and having an operative connection with the throttle valve, said movable member being ineffective to actuate the throttle valve to increase the fuel supply to the engine, when the brake pedal is depressed, and said movable member having a portion adapted to be engaged by the throttle pedal, whereby it may be relatively actuated on the brake pedal by independent movement of the throttle pedal to vary the supply of fuel fed to the vehicle engine, the connections between the throttle valve and throttle pedal being such that the throttle valve cannot be opened when the brake pedal is depressed, regardless of the movement of the brake pedal, and means for limiting the maximum opening of the throttle valve, whereby the vehicle cannot be driven beyond a predetermined speed, regardless of the manipulation of the throttle pedal.

HENRY E. STEIN.